United States Patent [19]
Matthews

[11] Patent Number: 6,082,723
[45] Date of Patent: Jul. 4, 2000

[54] TILE CAP BASE FOR CUTTING PRE-DEFINED ANGLES

[75] Inventor: Roger Allen Matthews, Grand Prairie, Tex.

[73] Assignee: PMD Corporation, Irving, Tex.

[21] Appl. No.: 09/229,506

[22] Filed: Jan. 12, 1999

[51] Int. Cl.[7] ................................................. B23Q 3/00
[52] U.S. Cl. .......................... 269/289 R; 30/289; 83/743
[58] Field of Search ........................... 30/294, 289, 290; 83/745, 574, 743; 269/289 R

[56] References Cited

U.S. PATENT DOCUMENTS

| | | |
|---|---|---|
| 364,508 | 6/1887 | Griffiths . |
| 465,121 | 12/1891 | Welch . |
| 1,619,091 | 3/1927 | Rieser . |
| 2,637,110 | 5/1953 | Gilbertson ................................. 33/104 |
| 3,718,980 | 3/1973 | Poulos .................................... 33/174 G |
| 4,054,077 | 10/1977 | Gram ....................................... 83/745 |
| 4,625,425 | 12/1986 | Senno et al. ............................... 33/477 |
| 4,776,100 | 10/1988 | Brumley .................................... 33/527 |
| 4,924,843 | 5/1990 | Waren ...................................... 125/35 |
| 5,169,045 | 12/1992 | Liu ........................................ 225/96.5 |
| 5,181,326 | 1/1993 | Eberline ................................... 33/527 |
| 5,205,045 | 4/1993 | Liu .......................................... 33/468 |
| 5,471,758 | 12/1995 | White, Sr. ................................. 33/527 |
| 5,615,665 | 4/1997 | Thiriet .................................. 125/23.02 |

*Primary Examiner*—Timothy V. Eley
*Assistant Examiner*—Benjamin M. Halpern
*Attorney, Agent, or Firm*—Locke Liddell & Sapp LLP

[57] ABSTRACT

The present invention relates to a device for holding tile during cutting to obtain defined angles, preferably 45° angles. The present invention further encompasses a method for using such a device in combination with a table-style tile cutter, preferably one using a roller tray with a lip, to cut defined angles into various orientations of tile and, more specifically, tile caps. The device comprises a base having a bottom and at least two straight edges that meet in a right angle in a corner of the base. In its preferred embodiment the base includes two grooves. One of the grooves includes a curved section shaped to mirror and support the concave side of the curved nose of a standard bullnose tile cap. The other groove includes a curved section shaped to mirror and support the convex side of the curved nose of a standard bullnose tile cap. These grooves allow for holding and supporting tile as aligned by the base for cutting pre-defined angles into various orientations of the tile. Alternative embodiments may include only one or the other of the two grooves.

5 Claims, 3 Drawing Sheets

6,082,723

TILE CAP BASE FOR CUTTING PRE-DEFINED ANGLES

FIELD OF THE INVENTION

This invention relates to a base used to assist in cutting pre-defined angles in tiles and tile caps using a standard table-style tile cutting saw.

BACKGROUND OF THE INVENTION

Tile and tile caps are frequently used as decorative trim in many modern bathrooms. One of the more difficult challenges for an installer of tile or tile caps is the consistent cutting of 45° angles in order to make smooth joints and transitions around corners and in other locations, as well as with common decorative trim patterns. This problem is exacerbated when using bullnose tile caps which are that much more difficult to lay on a smooth surface to use with a standard table-style cutting blade. While substantial art exists for measuring tile cuts and even for drawing complex angles, this art is often complex and does not address the basic need for 45° angles as well as cradling the tiled or tile cap to be cut in a quick and easy fashion.

For example, U.S. Pat. No. 5,471,758 to White, Sr. discloses a measuring device useful in determining the relative position and location of linear interferences with proper laying of floor tile. The device uses what is effectively a T-square to define a reference position using tile already in place. The device uses a linear sliding ruler to define how far in the direction orthogonal to the top of the T-square is available before the blockage. The device uses a planar semicircle rotatably attached to the end of the sliding ruler to rest against and define the linear blockage which must be accounted for. After the respective positions of the semi-circle and ruler are set, the device is removed from the ground and then placed in a reference position on the tile to be cut in order to allow a line to be drawn along the flat surface of the tile to define which part of the tile must be cut away to avoid the linear obstruction. The device plays no role in supporting the tile during the cutting process or assisting in defining the cut location other than its use to draw a line beforehand. The device does not provide assistance in even drawing a line on any plan other than the broad upper or lower surface of the tile.

Similarly, U.S. Pat. No. 5,205,045 to Liu discloses a cutting gauge which consists of a protractor and ruler on the end of the guide rod with a T-squarelike frame to secure the tile edges for marking. The device is designed to allow for the marking or scoring of a line of defined length and angle on the broad upper or lower surface of the tile. An earlier patent, U.S. Pat. No. 3,718,980 to Poulos discloses a measuring device which consists of a simple T-square and a single reference component which is movable linearly along the longitudinal portion of the T-square which may also rotate about its center point with respect to the T-square. This device, like a simpler vision of the White invention, is able to measure the span and angle of the available space for a tile. The device is then used to assist in marking or scoring the cutting line needed to cut the tile to fit the available space. The device plays no role in supporting the tile during the cutting process or assisting in defining the cut location other than its use to draw a line beforehand. The device does not provide assistance in even drawing a line on any plane other than the broad upper or lower surface of the tile.

Other devices may exist in the art for actual tile cutting, but these devices also provide a more complex method for cutting variable angles and involve complex table-size components with the concurrent increased expense and increased bulkiness and increased complexity that such matters would provide.

SUMMARY OF THE INVENTION

The present invention relates to a device for holding tile during cutting. The device comprises a base having a bottom and at least two straight edges that meet in a right angle in a corner of the base. In its preferred embodiment the base includes two grooves. There is a primary groove extending from one of the two straight edges to the other. The primary groove has a stop wall perpendicular to the bottom of the base and a curved section shaped to mirror and support the concave side of the curved nose of a standard bullnose tile cap. The base also has a planar support surface parallel to the base's bottom whose perimeter is defined by the two straight edges, the right angle corner where the two straight edges meet, and the edge of the primary groove which is closest to the right angle corner. The planar support surface is located above the bottom of the base but below the highest point of the stop wall of the primary groove. The preferred embodiment includes a secondary groove extending from one of the two straight edges to the other. The secondary groove also has a stop wall perpendicular to the bottom as well as having a curved section shaped to mirror and support the convex side of the curved nose of a standard bullnose tile cap.

In the preferred embodiment, both grooves are perpendicular to a line bisecting the right angle corner and thus may be used to position tile for cutting 45° angles. Alternative embodiments may include only the primary groove or only the secondary groove depending on the needs of the tile installer. The present invention also covers the method of using the tile cutting base in combination with a table-style tile cutter to cut defined angles (preferably 45° angles) into tile and, more specifically in the preferred embodiment, tile caps.

DETAILED DESCRIPTION OF THE INVENTION

The present invention relates to a base, which dramatically simplifies the problem of cutting tile caps or tile at predefined angles. The present device allows for accommodation and control of the curved end of bullnose tile caps and support of the tile caps themselves. While the device may also be used to cut tile, for purposes of the preferred embodiment the cutting of tile caps (a subset of general tile) will be addressed. One skilled in the art will recognize that many of the functions for cutting tile caps will be equally applicable to cutting tile generally. In the preferred method the base is used in combination with a water-cooled table-style tile cutter having a roller tray with a lip which guides the tile though the saw blade or cutting blade of the tile cutter. The tile cap may be placed in any of numerous orientations allowing for various dimensions of the tile cap to be cut at the predefined angle by simply aligning the base with the lip of the roller tray and pushing the tray and base forward along the table carrying the desired portion of the tile cap through the cutting blade at the desired angle and position. The base is inexpensive to make and simpler to use than the prior art systems involving complex arms and clamps in a table-size matrix.

In its preferred embodiment, the present invention uses a base that is a right triangle in order to cut 45° angles at various positions and orientations along a tile cap. Those with skill in the art will recognize that the angle of the primary grooves with respect to the right triangle may be modified to cut predefined angles. However, for joints, transitions, and some of the most common decorative tile patterns 45° angles provide the preferred and most useful embodiment of the present invention.

Figure 1:
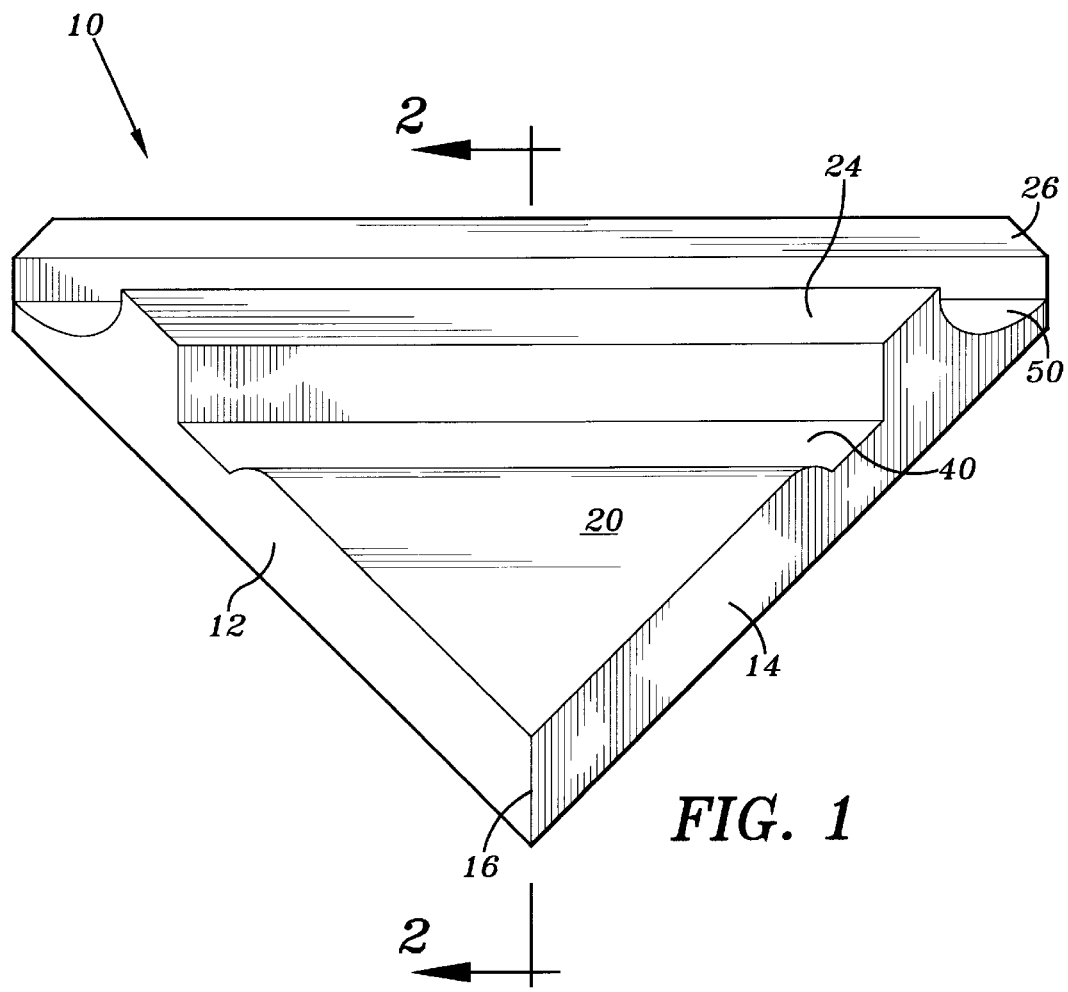
FIG. 1 is a perspective view of the base from in front and slightly above.

FIG. 1 illustrates base 10 from the front from an elevated position. Base 10 comprises at least two straight edges, straight edge 12 and straight edge 14, which intersect in corner 16. At the point of intersection, straight edge 12 and straight edge 14 form a right angle or 90° angle at corner 16.

Base 10 further includes a groove 40, which in the preferred embodiment is the primary groove, which is perpendicular to a line bisecting the right angle of corner 16. Said primary groove 40 extends from straight edge 12 to straight edge 14.

The upper surface of base 10 between corner 16 and primary groove 40, whose edges are defined by straight edge 12 and straight edge 14 is a planar support surface 20. The other side of primary groove 40 is defined by primary stop 24. In the preferred embodiment base 10 further includes secondary groove 50 extending from the back of primary stop 24 to secondary stop 26. While the illustrated preferred embodiment is triangular in shape, other shapes (such as parallelograms, diamonds, or even more rounded or artistic shapes could be used in accordance with the core inventive concept, so long as the shape included two straight edges intersecting in a corner which is at least approximately a right angle.

Figure 2:
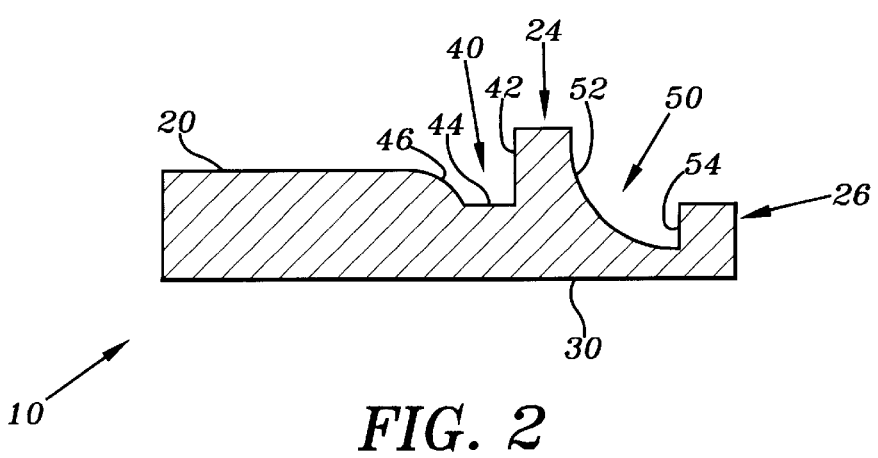
FIG. 2 is a cut-away view of the base looking into the grooves from the side.

FIG. 2 is a cutaway view of the base along the plane bisecting corner 16 looking into and along primary groove 40 and primary groove 50 from the side. Base 10 has a bottom surface 30, hereinafter referred to as bottom 30. In the embodiment pictured, bottom 30 is smooth and flat supporting the base 10 on the surface of the tile-cutting table. In alternative embodiments, some portions of this surface may be hollowed out to save material and/or improve molding characteristics, but the remaining surfaces will still define a plane represented by bottom 30. Support surface 20 is a plane parallel to and above the plane defined by bottom 30.

Primary groove 40 begins at the end of support surface 20 and curves downward via entry curve 46 to primary groove bottom 44. Entry curve 46 (the curved section of primary groove 40) is shaped to mirror, mate with, and support the concave side (or the inside) of the curved nose of a standard bullnose tile cap. Primary groove bottom 44 defines a plane parallel to the planes defined by support surface 20 and base bottom 30. On the other side of primary groove bottom 44 from entry curve 46 is primary groove stop wall 42, which is part of primary stop 24. Stop wall 42 is perpendicular to primary groove bottom 44 and support surface 20. The upper section of stop wall 42 is higher with respect to bottom 30 than support surface 20.

Secondary groove 50 begins on the backside of primary stop 24 with support curve 52 curving down and directly intersecting secondary stop 26 at secondary wall 54 (also referred to as the stop wall of secondary groove 50). Support curve 52 (the curved section of secondary groove 50) is shaped to mirror, mate with, and support the convex side (the outside) of the curved nose of a standard bullnose tile cap. Additionally, support curve 52 may extend upwards in a straighter line before entering its curved section in order to provide additional support for the straight section of a standard bullnose tile cap positioned within secondary groove 50 during the cutting process. In alternative embodiments, secondary groove 50, could be the only groove present or could be separated from primary groove 40 and primary stop 24 by more distance or additional structures.

Figure 3:
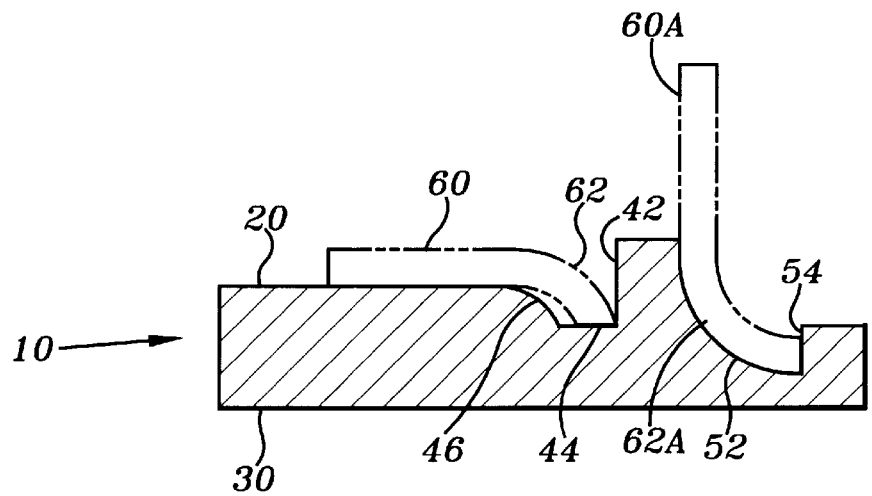
FIG. 3 is a cut-away view of the base looking into the grooves from the side with alternate positions for a bull-nose tile cap shown.

FIG. 3 illustrates two possible positions in which bullnose tile cap 60 or 60a is cradled and supported by base 10. Bullnose tile cap 60 or 60a includes a curved nose 62 or 62a respectively. This curved nose 62/62a makes this type of tile cap particularly difficult to cut using a table-style tile cutter without some form of support to cradle said bullnose tile cap. Base 10 provides such support and control for bullnose tile caps. Tile cap 60 rests primarily on support surface 20 while nose 62 extends into groove 40. The interior curve of nose 62 is supported by entry curve 46 while the end of nose 62 rests on primary groove bottom 44. Stop wall 42 stops and holds tile cap 60 from moving further towards the rear of base 10. Stop wall 42 further serves the function of aligning the entire tile cap 60 along the line defined by groove 40. With tile cap 60 placed in such a fashion, base 10 facilitates the cutting of a 45° angle, or other predefined angle, in the plane defined by the broad upper surface of tile cap 60. Because the top of stop wall 44 is higher than support surface 20, tile cap 60, could also be inverted, with its nose in the air and resting against stop wall 44, rather than descending into the groove. This alternative position could be used to provide additional orientations for cutting.

The alternate position shown by tile cap 60a uses secondary groove 50 to present tile cap 60a in a position which allows the cutting of 45° angle or other predefined angle, in the plane defined by the thin side of tile cap 60a. This angle is particularly useful for the joining of pairs of tile caps in a corner. In this position, tile cap 60a vertically extends downwards into groove 50. Nose 62a is supported by support curve 52 of secondary groove 50. The end of tile cap 60a stops against wall 54 of secondary stop 26. In this manner, tile cap 60a is supported and held with the primary portion of tile cap 60a extending vertically perpendicular to bottom 30. Wall 54 maintains orientation of tile cap 60a directly parallel to the line defined by secondary groove 50.

Figure 4:
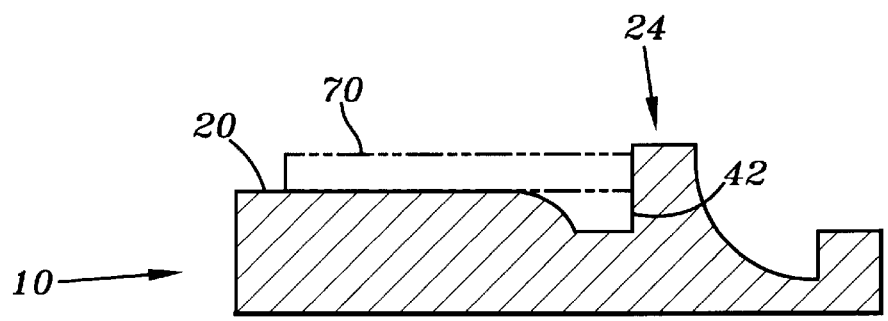
FIG. 4 is a cut-away view of the base looking into the grooves from the side with an alternative position for a flat tile shown.

FIG. 4 illustrates the positioning of a flat tile cap 70 on base 10. Tile cap 70 is primarily supported by support surface 20 and extends backwards to primary stop 24 where stop wall 42 holds tile cap 70 in place, and in position aligned with primary groove 40. This position allows for the cutting of a 45° angle within the plane of tile cap 70 defined by the broad surface of tile cap 70.

Figure 5:
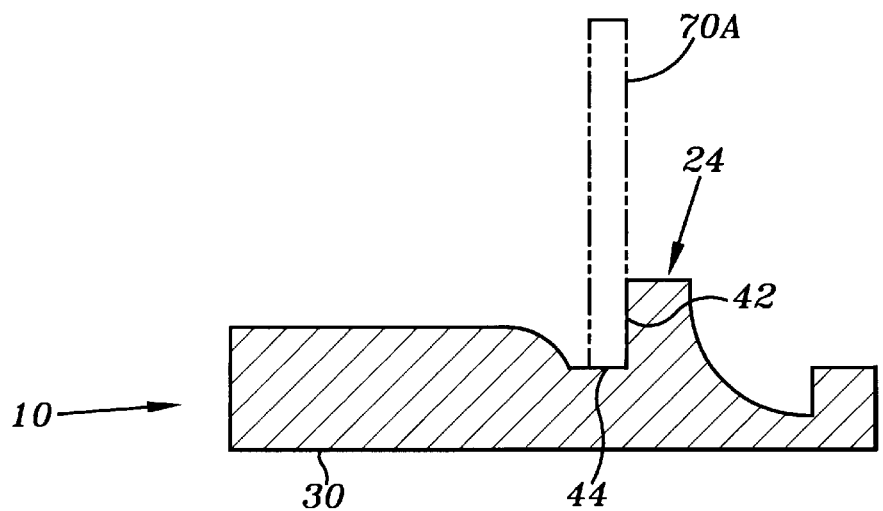
FIG. 5 is a cut-away view of the base looking into the grooves from the side with an alternative position for a flat tile shown.

FIG. 5 illustrates straight tile cap 70a in an alternative position with respect to base 10. In this position, tile cap 70a vertically extends upwards from primary groove bottom 44 perpendicular to base bottom 30. Stop wall 42 of primary stop 24 supports and aligns tile cap 70a along primary groove 40. This position allows for the cutting of a 45° angle within the thin sidewall of tile cap 70a much as the secondary groove is used to cut a 45° angle within the side of bullnose tile cap 60a. Note also that flat tile cap 70a could be stood on its thin end within groove 40 backed by stop wall 42 to cut a 45° angle within the other thin side plane as well, although cuts in this plane are rarely called for.

Figure 6:
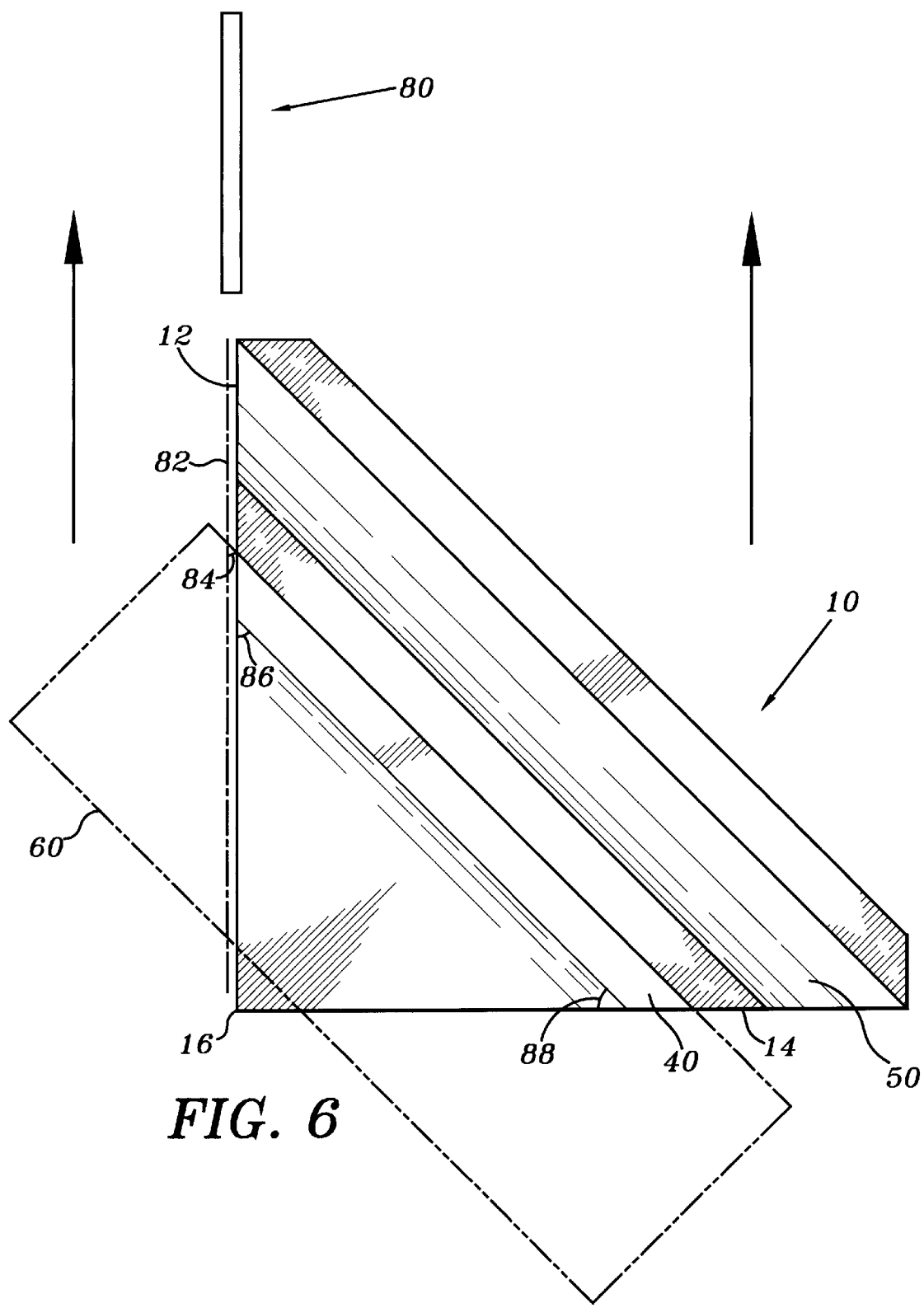
FIG. 6 is a top view of the base with a tile in position for cutting.

FIG. 6 illustrates the basic method for using base 10 to cradle tile cap 60 and cut tile cap 60 with a table-style tile cutter (generically a table saw which may be used to cut tile). While most professional table-style tile cutters incorporate water-cooling and particularly roller trays (sliding table surfaces that guide the tile through the blade), this specific type of tile-cutter, while preferred, is not necessary for the basic operation of the invention. A table-style tile cutter is provided with a cutting blade 80, which is vertical to the basic plane of the table. This would make the plane defined by blade 80 perpendicular to bottom 30 of base 10 as well as support surface 20 of base 10. Although not shown, the tile-cutting table would provide a horizontal support surface that preferably slides (hereinafter referred to as a roller tray) on which base 10 would rest. Most embodiments use a roller tray with a lip perpendicular to the blade on the side farthest from the blade. Tile cap 60 is placed in one of the positions defined in FIGS. 3, 4, and 5 or an alternative position as recognizable to one skilled in the art using the teachings of this patent, resting within and positioned by one of the grooves of base 10. Base 10 is aligned such that straight edge 12 defines a line parallel to the plane of vertical saw blade 80 and straight edge 14 defines a line perpendicular to the plane of vertical saw blade 80 and rests against the lip of the roller tray.

Note that tile cap 60 extends over or beyond straight edge 12 and therefore past support surface 20. The roller tray carrying base 10 is then moved towards saw blade 80 while maintaining the defined alignment (in part with support of the roller tray lip) such that saw blade 80 engages and cuts through tile cap 60 along dashed line 82. This provides a 45° angle cut. This angle may be seen at angle 84. This angle equals angle 86 between stop wall 44 of groove 40 and straight edge 12. If the cut were made on the other side of base 10 the cut would provide an angle equal to angle 88 between stop wall 44 and straight edge 14. Angle 88 will equal 90° minus angle 86. In the preferred embodiment, this angle would also be a 45° angle.

In other embodiments, groove 40 might be positioned other than directly perpendicular to a line bisecting corner 16 thus creating different angles on each side of corner 16 for the tile cap to be cut. Additionally, even with the preferred groove positioning, a wedge could be placed between straight edge 14, and the lip of the roller tray to modify the angle of the cut. A preferred example would involve the use of a triangular wedge with a 22.5° angle positioned such that the straight edge of base 10 aligned with the roller tray lip would have a 22.5° angle with respect to the tray lip rather than being precisely parallel to (and against) the tray lip. A wedge could similarly be placed between any straight edge of base 10 and the roller tray lip and any desired angle of wedge could be used depending on the orientation and angle desired for the cut.

While straight edge 12 or straight edge 14 could be pushed directly against saw blade 80 to allow the cut to take place and maintain saw blade 80 in precisely the desired angle with respect to tile cap 60, this could result in sawblade 80 accidentally digging into or creating undesired friction with base 10. The desired alignment may be reached and maintained by allowing some distance between the cutting line 82 and straight edge 12. The interaction between straight edge 14 and the lip of the roller tray helps insure proper orientation of the tile with respect to cutting blade 80. While FIG. 6 illustrates a tile cap 60 in place in primary groove 40 with base 10 being moved towards sawblade 80 with the corner 16 in a back position, other alignments are possible and may in some circumstances be desirable. As already discussed, cuts may be made either along straight edge 12 or along straight edge 14 depending on which side of the tile cap 60 is desired to be trimmed. Alternatively, base 10 could be rotated 180° with sawblade 80 engaging tile cap 60 from the other side of cutting line 82 and moving forward. Even in this configuration, where only a small amount of straight edge may be available to interact with the lip of the roller tray (or even in a case where there is no lip available or the roller tray does not move) it is much simpler to cut and maintain a straight line with the benefit of the straight edge 12 defining the parallel plane and straight edge 14 defining the perpendicular plane with respect to cutting blade 80.

The preferred triangular embodiment of base 10 illustrated may be used for additional purposes as well. For example the edge of the triangle opposite omer 16, may be rested against the lip of the roller tray and caps supported by the base using the grooves for straight 90° cutting. Tile caps could be placed on their sides flat against straight edge 12 or 14 with the other edge placed against the lip of the roller tray and moved through the blade to cut 45° angles within the thin sidewalls to accomplish from a different technique the cuts made using the configuration of FIG. 5. Even full tiles could be laid flat next to base 10, and against straight edge 12 or 14, and then easily cut at a 45° angle. This could halve full tiles or could be used to trim the corners as desired by the installer.

In summary, the tile cap base of the present invention uses the elements of a simple right triangle with grooves and stops to hold the tile cap in a number of orientations to allow consistent cutting of 45° angles in various planes of the tile cap. Its simple geometric construction allows holding and cutting multiple planes and orientations using a single piece on a roller tray with no additional moving parts. Again, while the preferred embodiment uses a right triangle with grooves perpendicular to the line bisecting such right triangle providing predefined 45° angles, alternative embodiments could change the orientation of the grooves with respect to corner 16 in order to allow the cutting of different but still predefined angles by the individual cutting the tile caps. Even in such alternative embodiments, the right angle at corner 16 would still be in place, providing straight edges 12 and 14 which can be aligned with the lip of the roller tray facilitating an easier time aligning the tile cap with the cutting blade 80.

Having described specific embodiments of the present invention, it will be understood that modifications thereof may be suggested to those skilled in the art, and it is intended to cover all such modifications as fall within the scope of the appended claims.

What is claimed:

1. A device for holding tile during cutting comprising:
    a base having a bottom and having at least two straight edges,
    said straight edges meeting in a corner of said base,
    said corner of said base forming a right angle;
    a groove in said base extending from one of said at least two straight edges to the other of said at least two straight edges;

a planar support surface on said base parallel to and disposed above said bottom where the perimeter of said planar support surface is defined by said at least two straight edges said corner, and the edge of said groove closest to said corner; and said groove having a stop wall perpendicular to said bottom and extending above said planar support surface.

2. The device for holding tile during cutting of claim 1 wherein said groove further comprises a curved section.

3. The device for holding tile during cutting of claim 1 wherein said groove in said base is perpendicular to a line bisecting said right angle corner of said base.

4. A device for holding tile during cutting comprising:

a base having a bottom and having at least two straight edges, said straight edges meeting in a corner of said base, said corner of said base forming a right angle;

a primary groove in said base extending from one of said at least two straight edges to the other of said at least two straight edges, said primary groove having a stop wall perpendicular to said bottom, said primary groove having a curved section;

a planar support surface on said base parallel to and disposed above said bottom where the perimeter of said planar support surface is defined by said at least two straight edges, said corner, and the edge of said primary groove closest to said corner;

said primary groove stop wall extending above said planar support surface, and a secondary groove in said base extending from one of said at least two straight edges to the other of said at least two straight edges, said secondary groove having a stop wall perpendicular to said bottom, said secondary groove having a curved section.

5. The device for holding tile during cutting of claim 4 wherein each of said grooves in said base is perpendicular to a line bisecting said right angle corner of said base.

* * * * *